United States Patent [19]

Wisecarver

[11] Patent Number: 4,669,934

[45] Date of Patent: Jun. 2, 1987

[54] LATCHING ASSEMBLY AND METHOD FOR A CARGO BRACING DEVICE

[75] Inventor: Warren R. Wisecarver, Walnut Creek, Calif.

[73] Assignee: Bishop-Wisecarver Corporation, Pittsburg, Calif.

[21] Appl. No.: 666,094

[22] Filed: Oct. 29, 1984

[51] Int. Cl.⁴ .......................... B60P 7/14; B61D 45/00
[52] U.S. Cl. ................................ 410/151; 292/259 R; 410/145
[58] Field of Search .................. 410/143, 152; 292/63, 292/67, 109, 114, DIG. 4, DIG. 31, DIG. 72, 113, 210, 247, 108, 259

[56] References Cited

U.S. PATENT DOCUMENTS

| | | | |
|---|---|---|---|
| 2,411,768 | 11/1946 | Welch | 410/151 |
| 2,482,959 | 9/1949 | Anderson et al. | 292/63 |
| 2,538,385 | 1/1951 | Schurman | 292/113 |
| 2,637,576 | 5/1953 | Nottingham | 292/DIG. 4 X |
| 2,830,843 | 4/1958 | Seaburg et al. | 292/DIG. 72 X |
| 3,049,328 | 8/1962 | Bishop | 410/151 |
| 3,674,329 | 7/1972 | Schill | 292/DIG. 4 X |

Primary Examiner—Randolph A. Reese
Attorney, Agent, or Firm—Manfred M. Warren; Robert B. Chickering; Glen R. Grunewald

[57] ABSTRACT

Disclosed is a latch assembly for a cargo bar of the type having at least two relatively displaceable members. A pivotally mounted handle is used to extend the members in opposite directions to engage in compression the opposite walls of a cargo container. The latch assembly includes housing having a latch element which is pivotally mounted by a pivot pin to the housing. The latch element is biased toward a latched position at which the latch element is in latching engagement with the handle of the extending bar assembly. The pivotal mount for the latch element is provided with clearance to enable displacement of the latch element relative to the pivot pin, and the housing is formed with a cap portion positioned proximate the latch for support of the latching force on the latch upon displacement of the latch relative to the pivot pin. The latch assembly also includes a ramp formed toward the base of the latch element to provide a method for easy release of the latch element. The ramp, when forced by the handle in a handle-releasing mode, pushes the latch element away from the latching position and breaks the latch element free of any ice or corrosion which may have formed in proximity to the latch element to impede its operation.

10 Claims, 3 Drawing Figures

U.S. Patent
Jun. 2, 1987
4,669,934
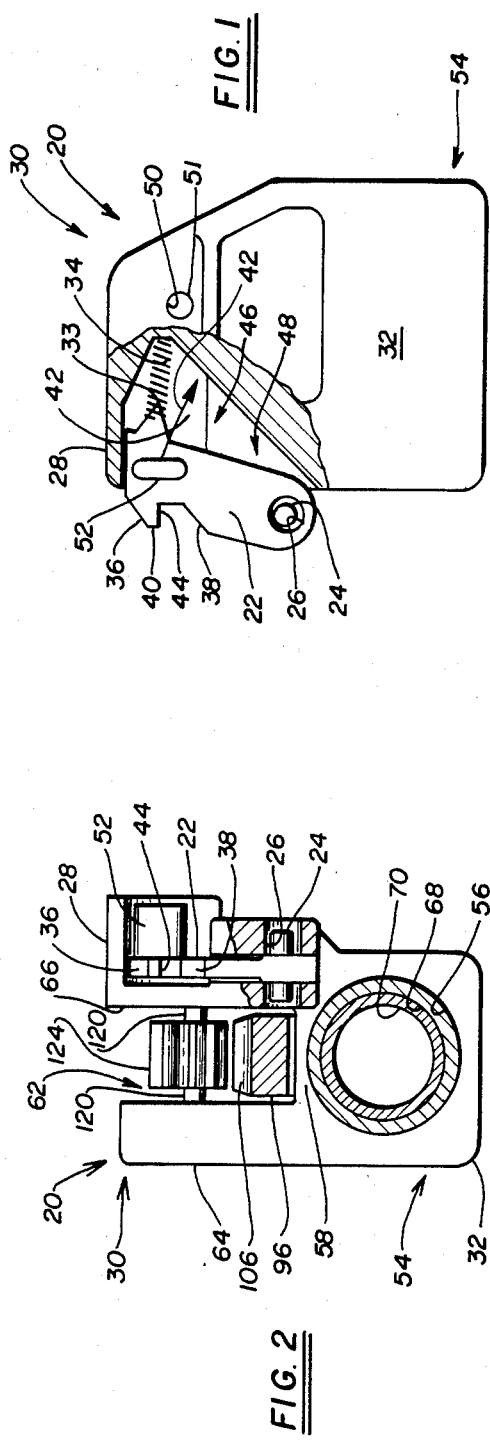
FIG. 1
FIG. 2
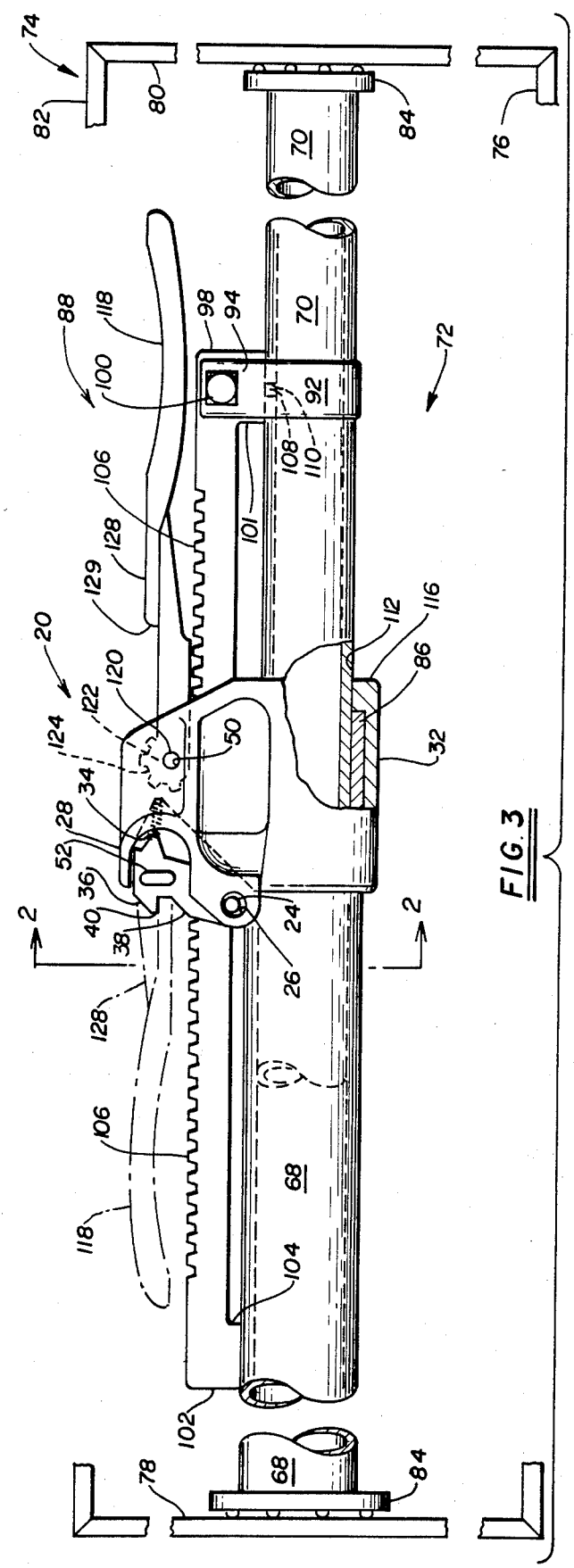
FIG. 3

LATCHING ASSEMBLY AND METHOD FOR A CARGO BRACING DEVICE

BACKGROUND OF THE INVENTION

The field of this invention relates generally to latching assemblies, and more particularly to latching assemblies for cargo bracing devices used in cargo carrying vehicles.

Latching assemblies for cargo braces or bars are known. For example, U.S. Pat. No. 2,411,768 to Welch discloses a boxcar brace having a pair of oppositely sliding first and second members which engage opposite walls of a cargo carrying container. A handle having teeth is mounted to pivot on the first member. When the handle is pivoted, the teeth engage cooperating slots provided on the second member to move the members in opposite directions. A locking tip or protusion on the pivoted handle engages a latch provided on the second member to secure the handle and extended members in place. The pivotal handle is subjected to a considerable force from the extensible members of the cargo bar in order to maintain the members in an extended position. This force is transmitted to the latch assembly and particularly the pivotal mount for the movable latch element. There is, therefore, considerable stress on latch assembly pivot pins and mating openings which tends to fatigue the metal over time.

An additional problem is that debris can enter the latch assembly with resultant mechanical blocking of movement of the latch and/or corrosion of the pivotal mount. The high stress and corrosion often produce "freezing" of the movable latch element, making release of the latch very difficult.

Another example of a cargo bar latch assembly is that of U.S. Pat. No. 3,049,328 to Bishop. Two laterally displaceable members are telescoped within each other to move in opposite directions when a handle is pivoted. After the members have been placed into contact with opposite walls of a cargo carrying device, the handle is pivoted approximately 180° to meet and slide past a spring-loaded latch. The handle is held in place by the latch, once the latch is passed, and the latch pops back into an extended position. Again this latch assembly is supported to move on a pin which must carry the full unlatching force on the handle. Additionally, the latch and spring are open to corrosion and other fouling which can cause the latch to freeze in place.

Since many cargo shoring applications are found in refrigerator trucks and rail cars, it is predictable that moisture will be present in such environments and will condense on metal members, such as the cargo bar latch assembly. In fact such assemblies often become literally frozen as a result of condensed, trapped and frozen moisture, and the presence of corrosive compounds, and particularly salts, causes corrosive freezing in addition to low temperature freezing.

When it is time to release such cargo shoring bars, they are seldom given time to thaw, and most latch release problems are handled by a blow from a hammer, wrench or other impact tool. This weakens the latch mechanism, and particularly the highly stressed pivot pin and generally greatly shortens the life of the cargo bar.

SUMMARY OF THE INVENTION

This invention improves over previous technology by offering a load transferring and easily releasable latch assembly for use on a load-securing cargo bar of the type having at least two laterally displaceable members, such as tubes or bars.

Included is a means for extending (such as a pivoting handle for engaging rack teeth) the two displaceable members. The extending means is formed to move the displaceable members so they engage in compression the opposite walls of a cargo carrying vehicle. The latch assembly includes a housing having a latch element, as well as means for pivotally mounting the latch element to the housing. The latch element is biased toward a latched position at which the latch element is in latching engagement with a portion of the extending means.

The improvement comprises a housing formed with a cap portion positioned to extend over the latch element when the element is in the latched position. The pivotal mounting means, such as a pin, is coupled to the housing to permit displacement of the latch element into load bearing engagement with the cap portion. Thus, the cap portion carries a force sufficient to relieve the load carried by the pivotal mounting means.

Additional features and embodiments include a latch assembly wherein: the laterally displaceable members are first and second tubes coupled to telescope one inside the other; the latch element is spring-loaded toward the latch engaged position; and, a ramp is positioned between the latch element locking tip and the latch element pivot point to assist in the breaking up of any ice or corrosion and thus release the handle from the latched position.

BRIEF DESCRIPTION OF THE DRAWINGS

FIG. 1 is a partial broken away side elevation view according to an embodiment of the invention;

FIG. 2 is an end view, partially broken away, of the latch assembly of FIG. 1;

FIG. 3 is a partially broken away side elevation view of the FIG. 1 embodiment adapted for use on one particular type of cargo bracing bar.

DETAILED DESCRIPTION OF A PREFERRED EMBODIMENT

Described below and shown in the Drawings is a specific preferred embodiment of that which the inventor considers at present to be the best mode of fabrication, assembly and operation for carrying out the invention. This is a necessarily narrow particular example of one of many possible ways to practice the claimed invention, which is much broader than described by this preferred embodiment. The actual breadth of the invention is defined by the appended Claims.

System Overview

Broadly stated, FIGS. 1 and 2 show respective side and end views of an inventive latch assembly 20.

Latch assembly 20 includes a movable latch element 22 which is pivotally mounted by inserting a generally cylindrical pin 24 through a circular hole 26 provided toward the bottom of latch 22. The upper end of latch 22 is positioned below a laterally extending flange or a cap portion 28 provided toward a top 30 of a housing 32. The difference in diameter between pin 24 and hole 26 and the spacing between latch 22 and cap 28 is sufficient to permit the top of latch 22, when the latch is in tension, to move into contact with cap portion 28. Latch 22 is spring-loaded through latch protrusion 33 by a spring 34 to bias latch 22 toward the latched position shown in the Drawing.

To engage and latch handle 118 (described below) in a lached position, an upper or first ramp 36 and a lower or second ramp 38 are provided on a front edge of latch element 22. Ramps 36 and 38 slope in the same direction. Upper ramp 36, at its lower end, terminates in a handle-locking pointed tip 40, and below tip 40 a substantially horizontal shelf or shoulder 44.

Within housing 32, latch 22 is positioned in a chamber 46. Latch 22 is spaced apart from housing 32 by a gap 48 which permits clearance for movement of the latch element to an unlatched position, as indicated by arrow 42.

In use, a protrusion 128 on handle 118 engages ramp 36 during a latching mode. As the handle protrusion moves down it slides along ramp 36 toward tip 40 and latch 22 is pivoted clockwise. When the handle protrusion passes tip 40, latch 22 snaps back in a counterclockwise direction, so the handle protrusion is caught by and rests against shoulder 44 in a closed latched mode. The handle protrusion, by exerting an upward unlatching force on shoulder 44, urges latch 22 upward, since the pin 24 fits loosely or has clearance with respect to bore 26, into contact with load bearing cap portion 28. Cap 28, therefore, carries a substantial portion of the force which would otherwise be carried by pin 24.

To easily disengage the handle from latch 22, the handle is urged further downward in the counter-clockwise direction to cause the handle protrusion to encounter lower or second ramp 38. As the handle protrusion moves down, it slides along lower ramp 38 and latch 22 is driven in a clockwise direction to break free any corrosion or ice. Thus loosened, latch 22 can be urged further in a clockwise direction by engaging tab 52 on the latch element with a thumb or finger of the user (not shown), to move tip 40 far enough into housing 32 so the handle protrusion can be rotated upward and away from latch 22.

Detail: Latch Assembly

In addition to the System Overview details described above, the FIG. 1 and FIG. 2 latch assembly 20 includes other features to enhance its operation.

A hole 50 penetrates housing 32 toward top 30, and is designed to receive and hold a pin 120 and handle 118. Latch 22 is provided with a perpendicularly attached flange or tab 52 for thumb manipulation by a user as appropriate.

Visible in FIG. 2 toward a bottom 54 of housing 32 is a bore 56, designed to receive a cargo bracing bar assembly as discussed in the FIG. 3 description below. Above bore 56, housing 32 is provided with a transversely extending housing portion 58 having an upper surface which serves as a floor of a slot 62. Slot 62 is defined by an upright member 64 which is parallel to an upright member 66, both of which are perpendicularly joined to housing portion 58. As indicated by the phantom lines, bore 56 is fabricated to receive an outer tube 68 and a telescoped inner tube 70 of a cargo bracing bar assembly.

Detail: Environment

FIG. 3 shows a typical environment in which latch assembly 20 can be used.

Latch assembly 20 is mounted on a cargo bracing bar assembly 72 which is used to prevent cargo (not shown) from shifting within a container 74. Container 74 will typically include a floor 76 having a pair of parallel walls 78 and 80 rising vertically away from floor 76, to terminate in a roof 82 joined to the upper ends of walls 78, 80. Cargo bracing bar assembly 72 is locked into position by compression against the interior surfaces of opposing walls, most typically walls 78 and 80, to thereby prevent shifting of cargo within the container. As will be appreciated, cargo bars also are used between floor 76 and roof 80.

Cargo bracing bar assembly 72 includes outer tube 68, into an end of which telescopes an inner tube 70. On the free end of each tube 68, 70 is secured a pad or foot 84 adapted to frictionally engage walls 78 and 80. An end 86 of outer tube 68 is secured to latch assembly housing 32 which also carries a handle assembly 88. Latch assembly 20 is used in combination with handle assembly 88 for final extention and latching of tubes 68 and 70 in compression between walls 78 and 80, for securely bracing cargo.

In order to achieve relative displacement between tubular elements 68 and 70, a collar 92 is secured on inner tube 70. Collar 92 is spaced between the ends of inner tube 70 to leave sufficient length for telescoping of tube 70 into outer tube 68. From the top of collar 92 extend parallel ears 94. A rack element 96 has one end 98 secured between ears 94 by attaching means such as a bolt 100. Bolt 100 and a downwardly depending leg 101 from rack element 96 are formed so as to position rack 96 from the outside surface of inner tube 70 so that outer tube 68 can telescope between the rack and inner tube.

A free end 102 of rack 96 has a spacer leg or projection 104 which rests on and slides over the outside surface of outer tube 68. On the upper or outer face of rack 96 are a plurality of transverse, flat teeth 106. The foot 101 of secured end 98 of rack 96 is provided with a stud 108 projecting into a hole 110 provided in inner tube 70 for anchoring rack 96 and collar 92.

Onto end 86 of outer tube 68 is fixedly mounted housing 32 having an inwardly extending lip 116 defining a bore 112 dimensoned for receipt of inner tubular member 70. The inner periphery of lip 112 slidably receives inner tube 70 to aid in its aligning.

Handle assembly 88 includes a handle 118, mounted between upright members 64 and 66 by a pin 120. Pin 120 also penetrates a bore provided in a hub 122 of the handle to pivotally secure handle 118 in place between housing uprights 64 and 66. On the periphery of hub 122 are a plurality of gear teeth 124 for engaging teeth 106 of rack 96. Gear teeth 124 are arranged over an arc of such length that when handle 118 is pivoted about 180° clockwise from the locking position (shown in phantom in FIG. 3) to the open position (shown in solid in FIG. 3), then all teeth 124 are disengaged from rack 96 to permit unobstructed sliding of rack 96 between upright members 64 and 66 for the major adjustment of telescoping inner tube 70.

At the end of handle 118 away from the portion which is gripped by the user is a laterally projecting locking or latching protrusion 128. Protrusion 128 is so spaced from hub 122 that when handle 118 is swung from its open unlatched position in a counter-clockwise direction to the closed latched position shown in phantom, protrusion 128 projects laterally outwardly to slot 62 toward the front of upright member 66. The end 129 of protrusion 128 is preferably sloped or curved as shown to facilitate engagement with upper or first ramp 36 of spring-loaded latch 22. The cargo bar extension structure shown in the drawing therefore, in substantially as described in more detail in U.S. Pat. No. 3,049,328.

Detail: Operation

In operation, the FIG. 3 cargo bracing bar assembly 72 is placed between opposite walls 78, 80 of container 74, generally in the position shown in FIG. 3, initially with handle 118 in its open position.

Handle 118 has three primary positions which are:

(1) a resting open position as shown in solid lines in FIG. 3, wherein handle 118 is released and tubes 68 and 70 are disengaged from walls 78, 80;

(2) a latched or closed position, shown in ghost in FIG. 3, wherein handle 118 has been pivoted counter-clockwise 180° to the position shown in phantom, with protrusion 128 resting against shelf 44 of latch 22 so handle 118 is locked into position with tubes 68 and 70 rigidly in compression against walls 78, 80; and (3) a releasing or dynamic unlatching position, wherein handle 118 is initally in the latched position, and then is grasped and moved further counter-clockwise so protrusion 128 engages and slides against second or lower ramp 38, thus urging latch 22 in a clockwise direction to break free any ice or corrosion and pivot the latch forward slightly.

Initially, handle 118 is in the open position, to permit manual extension of telescoping inner tube 70 to bring pads 84 into contact with truck walls 78, 80. Then handle 118 is grasped and turned counter-clockwise into the phantom line position shown in FIG. 3. During this movement, gear teeth 124 engage rack teeth 106 to exert a spreading force through rack 96 to collar 92 and hence to tube 70, to thereby extend tubes 68, 70 in opposite directions for the final tightening of bracing bar 72. This compresses pads 84 into tight holding positions.

As handle 118 is pivoted into the latching mode, the curved lower edge 129 of protrusion 128 engages upper ramp 36 of latch 42. This causes latch 22 to pivot clockwise into chamber 46 against spring 34. After protrusion 128 passes tip 40, latch 22 is snapped back by spring 34 into the latching position, so the handle of the bracing bar is latched firmly in position to thereby maintain the axial force between members 68 and 70 and secure the bar bracing position between walls 78, 80.

Second or lower ramp 38 is provided on latch 22 to facilitate disengaging latch 22. This arrangement is particularly useful when latch assembly 20 is used in an environment such as the interior of a refrigerator truck where freezing of water and corrosion due to chemials can make it quite difficult to pivot latch 22 about pin 24. Ice or debris can gather in gap 48 between latch element 22 and housing 32 and corrosion and/or ice can form around pivot pin 24 to "freeze" latch 22 in place.

By urging handle 118 downwardly away from latch shoulder 44 protrusion 128 engages lower ramp 38. The force exerted by the lever arm length of handle 118 enables a great deal of force to be applied against lower ramp 38 and hence to latch element 22. Gradually increasing force can be applied to handle 118 until latch 22 breaks free, at which time a user's thumb can engage flange 52 on the latch element to further push latch 22 in a clockwise direction, thus freeing handle 118 to be rotated in an opposite direction to the open resting position.

When in the closed latched position, protrusion 128 exerts a large upward force against shelf 44 of latch 22, which normally would be transferred to pin 24. To avoid excessive loading on pin 24, housing 32 is provided with a transverse flange or cap portion 28 which extends over the top of latch 22. Additionally, hole 26 within latch 22 has a diameter enough larger than that of pin 24 to permit upward movement of latch 22 so it can engage cap portion 28 when handle 118 is in the latched position. Thus, a substantial portion of the force exerted on latch 22 by handle 118 is transferred to cap portion 28 which can much more easily carry the forces encountered. This has the advantage of permitting use of a small diameter pin 24, so pin 24 can have a much smaller cross-sectional area for use in cramped quarters having tight tolerances.

As will be appreciated, release of the latch by driving the handle down against the ramp also will displace latch element 22 slightly in a linear manner about pin 24 as well as rotating the latch about the pin. It should be noted that it is relatively easy to apply a downward force to handle 118 to effect release by gripping tubular member 68 and the handle and squeezing.

While the above best mode provides a full and complete disclosure of a specific embodiment of the invention, it is noted that various modifications, alternate constructions, and equivalents can be employed without departing from the true spirit and scope of the invention. Therefore, the above example description and interrelated drawings shall not be construed as limiting the invention. The much broader scope of the invention is defined by the breadth of the appended claims.

What is claimed is:

1. A latch assembly for a cargo bar having two relatively displaceable members and an extension assembly coupled to said members for relative displacement thereof, said extension assembly including a manually manipulatable handle coupled through a drive assembly to displace said members into engagement with opposing walls of a cargo container, and said latch assembly mounted to engage and latch said handle in a latched position against displacement under the compression forces produced by said extension assembly to thereby retain said members in relatively fixed relation, wherein the improvement in said latch assembly comprises:

said latch assembly including:
(i) a latch element having a top with an upwardly facing surface, said latch element being formed to engage and latch said handle against movement away from said latched position;
(ii) pivotal mounting means mounting said latch element to a remainder of said latch assembly for pivotal movement about an axis to and from said latched position, said mounting means including an opening and a pivot pin mounted through said opening;
(iii) spring biasing means biasing said latched element for movement toward said latched position;
(iv) a cap portion positioned proximate said latch element and having a flange oriented substantially parallel to said upwardly facing surface of said top when said latch element is in said latched position;

said opening of said pivotal mounting means having a dimension in a plane substantially perpendicular to said flange greater than the dimension of said pin along said plane and said spring biasing means being coupled to said latch element for displacement of said latch element in said latched position transversely of said axis under forces on said latch element from said handle and from said spring biasing means a distance causing contact of an area of said upwardly facing surface of said top with an area of said flange for support of a substantial portion of said forces on said latch element by said flange of said cap portion.

2. The assembly of claim 1 wherein,
the pivotal mounted means is formed with clearance between relatively pivoting parts to permit the displacement.

3. The assembly of claim 1, and
latch release means formed to permit forced release of the latch element from the latched position and including a ramp provided on the latch element; and
the handle being further formed to engage the ramp to produce displacement of the latch element away from the latched position to effect forced release of the latch element.

4. The assembly of claim 3 wherein,
the latch element includes a shoulder positioned to engage the handle and secure the handle in the latched position; and
the ramp is positioned in generally opposed relation to the shoulder for engagement of the handle upon movement of the handle away from the shoulder.

5. A latch assembly for a cargo bar of the type having at least two relatively displaceable members, extending means including a pivotally mounted handle coupled to displace the members to cause them to engage opposite walls of a cargo carrying container, and a latch assembly having a latch element with a shoulder positioned to engage the handle to latch the handle and secure the members against movement away from the walls, the latch assembly including a housing, means movably mounting the latch element to the housing, and biasing means coupled to bias the latch element toward a latched position, wherein the improvement comprises:
(a) the housing being formed with a cap portion positioned over the latch element when the element is in the latched position;
(b) the means movably mounting the latch element is comprised of a bore in said latch element and a pivot pin mounting the latch element to the housing for pivotal movement, the bore being dimensioned to provide clearance between the pivot pin and the bore for displacement of the latch element relative to the pivot pin into load carrying engagement with the cap portion;
(c) latch release means formed to permit forced release of the latch element from the latched position and including a release ramp provided on the latch element and positioned in generally opposed relation to the shoulder; and
(d) the handle being further mounted to engage the release ramp upon pivotal movement of the handle away from the shoulder to produce displacement of the latch element away from the latched position and thereby effect forced release of the latch element.

6. The latch assembly of claim 5 wherein,
the latch element further includes a latching ramp positioned radially outwardly of the shoulder with respect to the pivot pin and formed for engagement by the handle as the handle moves toward latching engagement with the latch element, the latching ramp when so engaged by the handle causing the latch element to move against the biasing means in a direction away from the latcned position, the latching element further having a tip located at the end of the latching ramp beyond which the handle passes to move to the latched position, the shoulder being positioned inwardly of the tip and transversely oriented to engage the handle in the latched position, and the release ramp being disposed on the latch element beneath the shoulder and sloping in the same direction as the latching ramp for engaging the handle as the handle is moved beyond the latched position in a direction away from the shoulder, the protrusion sliding along the release ramp to cause the latch element to forcefully move away from the latched position in response to the force exerted by the handle on the release ramp so the handle can be returned to an unlatched position.

7. An improved latch assembly for a cargo bar of the type having at least two laterally displaceable members and means for extending the members including a pivotally mounted handle, and a latch assembly mounted for movement of a latch element into engagement with the handle to effect latching, tne handle being pivotal between an open resting unlatched position and a closed resting latched position, the means for extending being formed to displace the members so they engage opposite walls of a cargo carrying vehicle, and the latch assembly including a housing, a latch element having a shoulder formed to engage the handle, the latch element being pivotally mounted to the housing, the biasing means biasing the latch element toward a latched position at which the latch element is in latching engagement with the handle of the extending means, wherein the improvement comprises:
(a) the housing being formed with a cap portion positioned to extend over the latch element when the latch element is in the latched position;
(b) the latch element is pivotally mounted to the housing by a pivot pin which penetrates a hole provided in the latch element, the pivot pin having a circular cross-section with a diameter enough smaller than the diameter of the hole to permit the latch element, when engaged by the handle in the latched position, to move into load transferring contact with the housing cap portion so the cap portion carries at least a portion of the load which would otherwise be borne by the pivot pin; and
(c) a ramp positioned between the shoulder and the hole on the latch element and formed for sliding engagement of the ramp by the handle upon pivotal movement of the handle toward the latch element to cause the ramp and the latch element to pivot away from the latched position to permit release of the latch element.

8. The mechanism of claim 7, further including a thumb release attached to and extending laterally away from the latch element for actuation by a thumb of a user for releasing the handle from the latched position.

9. An improved latching head, in combination with an extensible load bracing device for engaging opposite walls of a vehicle, the device including a first bracing bar, a second bracing bar slideably telescoped relative to an end of the first bracing bar, a friction pad on the free end of each bracing bar, the first and second bracing bars being axial extensions of one another, an extension member secured to the second bar and extended along the second bar and spaced in relation to the second bar so as to extend axially over and along the exterior of the first bracing bar, a latching head on the first bracing bar, a handle pivoted on the latching head adjacent the extension member connecting means between the handle and the extension member for converting the pivotal movement of the handle into relative longitudinal movement of the extension member and the first and second bracing bars, releasable means for latching the handle with the extension member in an extended position of the first and second bars, the latching head including parallel upright members straddling the extension member for guiding thereof, the releasable means for latching the handle including a spring latch mounted from one of the upright members, a projection extended from the handle for engagement by the spring latch, and coacting means on the one of the upright member and on the spring latch for releasing the spring latch from the handle projection at will, wherein the improved latching head comprises:

(a) the latching head having an upper portion ending in and defining a load carrying cap portion; and
(b) the spring latch being pivotally mounted to the latching head and provided with a first ramp for engaging the connecting means, shoulder means opposite said first ramp for capturing and holding the projection, and a second ramp spaced apart from and opposed to the shoulder means for causing the projection to release the connecting means, with the spring latch being pivotally mounted with enough slack at the pivot point to permit the top of the spring latch to be urged by the handle into contact with the cap portion so the cap portion carries part of the load exerted by the handle on the spring latch.

10. A method of releasing a movable handle secured in a latched position by a latch assembly having a latch frame with a transversely extending flange, a latch element with a top surface, and pivotal mounting means mounting said latch element to said frame for pivotal movement about an axis and for movement transverse of said axis until said top surface is in load supporting engagement with said flange comprising the steps of:

providing said latch element with a latching shoulder engaging said handle in said latched position and with a spaced apart opposed ramp formed for engagement by said handle and oriented to effect displacement of said latch element away from said latched position upon displacement of said handle into engagement with said ramp; and releasing said handle from said latch element by displacing said handle out of engagement with said shoulder and into engagement with said ramp.

* * * * *